United States Patent [19]

Kawai

[11] Patent Number: 4,835,675
[45] Date of Patent: May 30, 1989

[54] MEMORY UNIT FOR DATA TRACING

[75] Inventor: Joji Kawai, Hyogo, Japan

[73] Assignee: Mitsubishi Denki Kabushiki Kaisha, Tokyo, Japan

[21] Appl. No.: 111,082

[22] Filed: Oct. 19, 1987

Related U.S. Application Data

[63] Continuation-in-part of Ser. No. 733,454, May 13, 1985, abandoned.

[30] Foreign Application Priority Data

May 14, 1984 [JP] Japan ................................ 59-94478

[51] Int. Cl.⁴ ............................................. G06F 11/00
[52] U.S. Cl. ................................ 364/200; 364/251.3; 364/264; 364/267
[58] Field of Search ... 364/200 MS File, 900 MS File

[56] References Cited

U.S. PATENT DOCUMENTS

| | | | |
|---|---|---|---|
| 3,704,363 | 11/1972 | Salmassy et al. | 364/200 |
| 4,166,290 | 8/1979 | Furtman et al. | 364/200 |
| 4,611,281 | 9/1986 | Suko et al. | 364/200 |
| 4,636,941 | 1/1987 | Suko | 364/200 |
| 4,639,917 | 1/1987 | Furuta | 371/10 |

Primary Examiner—Gareth D. Shaw
Assistant Examiner—Debra A. Chun
Attorney, Agent, or Firm—Bernard, Rothwell & Brown

[57] ABSTRACT

A memory unit for tracing data receives and records data from a data bus together with a set of marking bits or a predetermined code identifying a selected address detected by an address detecting and pulse generating circuit. The data and code are temporarily recorded in a tracing memory which may be a FIFO shift register or a RAM which is addressed by a counter incremented by each pulse from the pulse generating circuit.

2 Claims, 4 Drawing Sheets

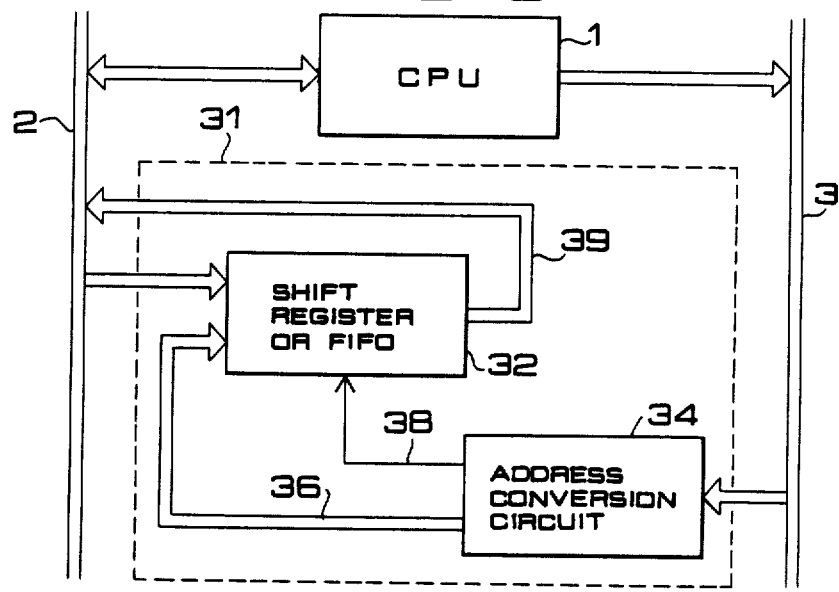

MEMORY UNIT FOR DATA TRACING

This is a continuation-in-part of application Ser. No. 733,454, filed May 13, 1985, now abandoned.

BACKGROUND OF THE INVENTION

1. Field of the Invention

This invention relates to a memory unit to be used with a controller for temporarily storing data for tracing information sent to or from selected devices by a central processing unit (CPU) operating in accordance with a program. The stored data is used to trace previous operation of the controller in event of malfunction or failure.

2. Description of the Prior Art

A memory unit as shown in FIG. 1 has conventionally been used as such a memory unit for tracing. Referring to the drawing, numeral 1 denotes a central processing unit (hereafter to be referred to as CPU) included in a control unit, 2 denotes a data bus for transferring or receiving data between the CPU 1 and memory or input-output units (not shown), and 3 denotes an address and command bus, the CPU and both the buses being essentially included in the control unit. And, 11 denotes a conventional memory unit for tracing adapted to the CPU, 12 denotes a memory for storing the data to be traced, 13 denotes a binary counter for outputting a part of the address for the tracing memory 12, 14 denotes an address conversion circuit in response to signals from the address and command bus 3 for generating the remaining portion of the address for the memory and for generating pulses for actuating the memory 12 and causing the binary counter 13 to increase its count.

Now, operation of the unit in FIG. 1 will be described. A memory unit for tracing of this kind is generally adapted so as not to affect the operation of the control unit as a whole. That is, while the CPU 1 is performing its controlling and processing functions by inputting and outputting data from and to other memory or input-output units, the data are adapted to be simultaneously stored in the tracing memory 12 to enable analyzing a malfunction. More particularly, if it is assumed that three kinds of data A, B, and C, or address locations of output units, are to be traced, then the address conversion circuit 14 detects these addresses from signals on the address and control bus 3, at which time the data bus 2 receives respective data ($A_1$, $A_2$, $A_3$, ..., $A_N$), ($B_1$, $B_2$, $B_3$, ..., $B_N$), and ($C_1$, $C_2$, $C_3$, ..., $C_N$) and outputs address signals 16 to the memory 12 corresponding to the kind of the data, i.e. the address value of signals 16 being in correspondence with the addresses of data A, B, and C. The conversion address 16 for example is (0, 0) for the data A, (0, 1) for the data B, and (1, 0) for the data C. The address conversion circuit 14 at the same time provides the memory 12 with a write pulse for its writing the data then present on the data bus 2, namely the instantaneous value of any of the data A, B, and C, in a corresponding memory section designated by address 16. Thus, the instantaneous value of any of the data A, B, and C is written in the memory 12 at an address represented by a combination of the output signal 15 from the binary counter 13 and the output signal 16 from the address conversion circuit 14.

Since the controlling and processing operations by the CPU 1 are performed periodically, the instantaneous data of the data A, B, and C are written in the memory, for example, in the order: $A_1$, $B_1$, $C_1$, $A_2$, $B_2$, $C_2$, $A_3$, ..., $A_N$, $B_N$, $C_N$. Then, in order that the same kind of data may not be written in the same address in the memory, the address conversion circuit 14 is adapted to provide the binary counter 13 with a pulse output signal 17 for its counting such that the counter 13 increases its count only when a specific data address, for example, the address for data C, is detected. Since the count on the binary counter 13 again returns to zero when it is counted up to the maximum count, the most recent data from the present to the past are always stored in the memory 12.

FIG. 5 shows a detailed circuit diagram of the address conversion circuit (ACC) 14 in FIG. 1. An address detection logic (ADL) 51 outputs five signals determined in relation to address signals from the address/command bus 3. An address conversion logic (ACL) 52 converts address signals and read signals from the address/command bus 3 into the address signal 16 determined in relation to the addresses being detected and outputs the signal 16 as a part of address input signals of the tracing memory 12. ROM, PAL (programmable array logic), or gate logic ICs can be used for ADL 51 and ADL 52.

Operation of these components will be described below with reference also to FIG. 1.

When CPU 1 inputs or outputs data via the data bus 2, it outputs a read signal or a write signal on bus 3 together with an address signal corresponding to the above-mentioned data. When the address signal relates to data A, B or C, ACL 52 converts the address signal or read signal so as to output a corresponding address signal 16 (e.g. 00, 01 or 11) to the tracing memory 12. Thus, each of the data ($A_1$, $A_2$, $A_3$, ..., $A_n$; $B_1$, $B_2$, $B_3$, ..., $B_n$; $C_1$, $C_2$, $C_3$, ..., $C_n$) are grouped together in locations in the tracing memory 12 corresponding to the addresses being monitored, so that upon a malfunction, the data in the location corresponding to the malfunction can be examined to assist in determining the cause of the malfunction.

However, address values corresponding to data A, B and C to be written in the tracing memory 12 are not always called by CPU 1 in succession. On the other hand, the memory cannot be utilized up to its full capacity unless the addresses being monitored are accessed in succession.

Further, the read signal is inputted to ACL 52 because it is necessary to allot respectively different address regions in the memory 12 for both data being read and written to the same address being monitored. For example, 010 and 011 on address lines 16 can designate data being read from and being written to, respectively, the same device.

ADL 51 receives an address input, and if the value of the address relates to A, B or C, it outputs an active signal to AND GATE 54 or 55. Then, a write signal will be outputted to the memory 12 at the time of a read signal or write signal.

Owing to the above-mentioned operation, data A, B or C will be given to the tracing memory as its input data and address values in which those data should be stored shall be given to the address input together with a memory write signal.

Furthermore, when the value of an address input to ADL 51 relates to data C, the ADL 51 gives an active signal to AND LOGIC 57. As the result, the counter 13 is subjected to increment via NOR LOGIC 59.

Meanwhile, both AND LOGIC 53 and 56 are utilized when any data stored in the tracing memory 12 must be read out. In the case of reading data out of the tracing memory 12, addresses respectively different from those in the case of writing are allotted to data A, B and C respectively. ACL 52 responds to these different addresses and outputs the correct address as an address input, to the tracing memory 12, Also, ADL 51 detects these different addresses and gives an active signal to AND gate 53 which then outputs a read signal to the memory 12. In addition, when data C is read out, ADL 51 gives an active signal to AND gate 56 so as to increment the counter 13.

Since the conventional memory unit for tracing is constructed as above, the maximum number of addresses that can be traced are limited by the number of bits of the output 16 from the address conversion circuit. Also there is a disadvantage that the efficiency of utilization of the memory is lowered in the case where the number of addresses to be monitored are less than the maximum number. Further, if the periods between addressing the different output devices are different, either the count pulse 17 in the binary counter 13 has had to be responsive to the input and output timing that has the shortest period, or additional memory units for tracing have had to be provided to record all the data presented at the different addresses. In the former case an, the efficiency in the use of the memory for tracing would be decreased and in the latter case uneconomical disadvantage would be involved.

SUMMARY OF THE INVENTION

The present invention contemplates to overcome the above described disadvantages involved in the conventional unit. The primary object of the invention is to provide a memory unit for data tracing capable of the tracing with high efficiency by using a control unit having a limited memory capacity wherein previously determined marking bits or codes corresponding to the addresses of the data being written in the memory are written in the memory simultaneously with the data.

In an embodiment of the present invention, the tracing memory unit is provided with a control unit with a central processing unit included therein and periodically repeating controlling operations in accordance with a program, pulse generating circuit means in response to an address signal and a control signal output from the central processing unit for generating a code signal, a write pulse, and a trigger signal, a tracing memory responsive to the write signal for simultaneously storing the data input or output by the central processing unit and the code signal generated by the pulse generating circuit means, and a counter in response to the trigger signal for increasing its count to provide the tracing memory with the next address signal.

BRIEF DESCRIPTION OF THE DRAWINGS

FIG. 3 is a block diagram showing a control unit including another memory unit for tracing of the present invention;

FIG. 4 is an illustration of stored states of the data in the memory included in the unit shown in FIG. 2;

DETAILED DESCRIPTION OF THE PREFERRED EMBODIMENTS

Figure 1:
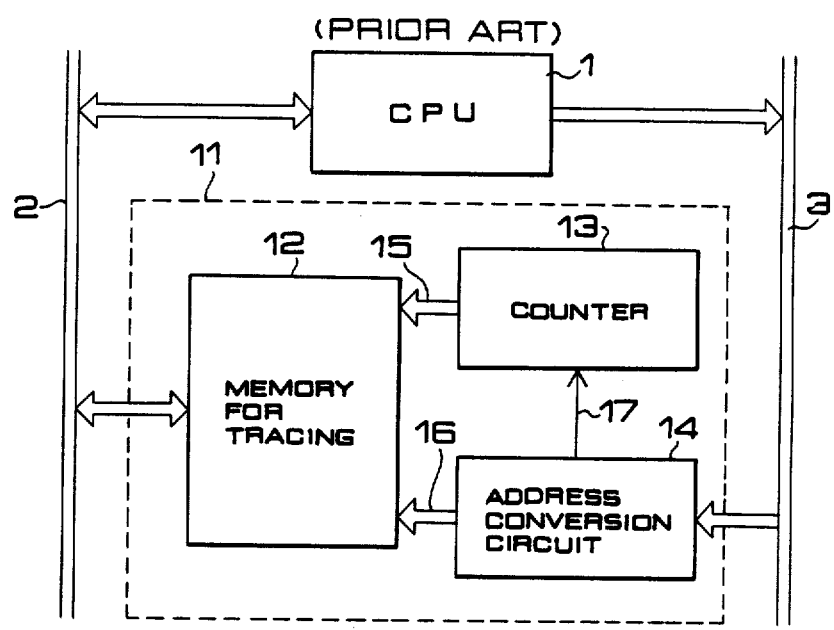
FIG. 1 is a block diagram showing a control unit including a conventional memory unit for tracing.
Figure 2:
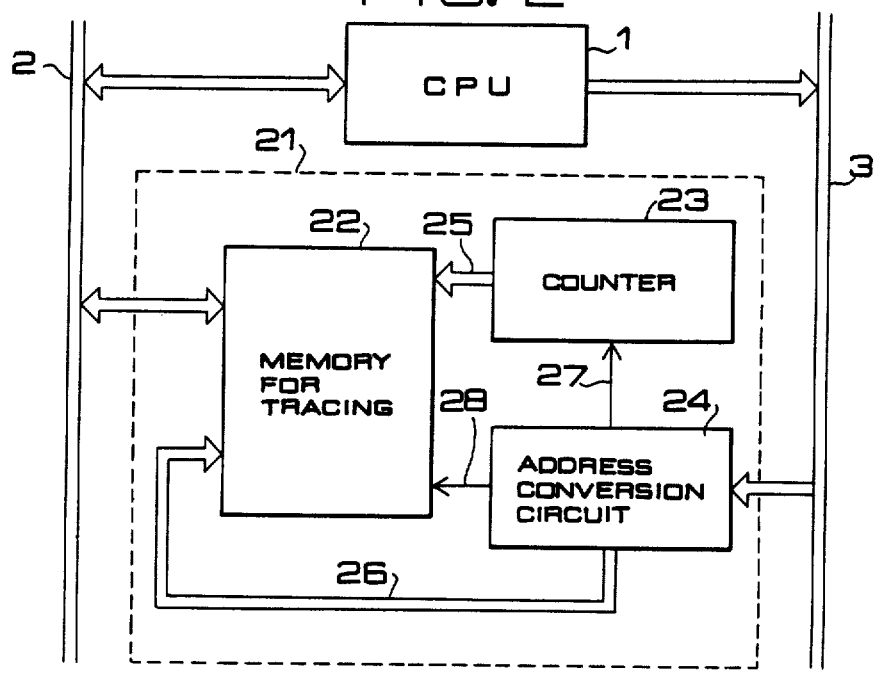
FIG. 2 is a block diagram showing a control unit including a memory unit for tracing of the present invention.
Figure 5:
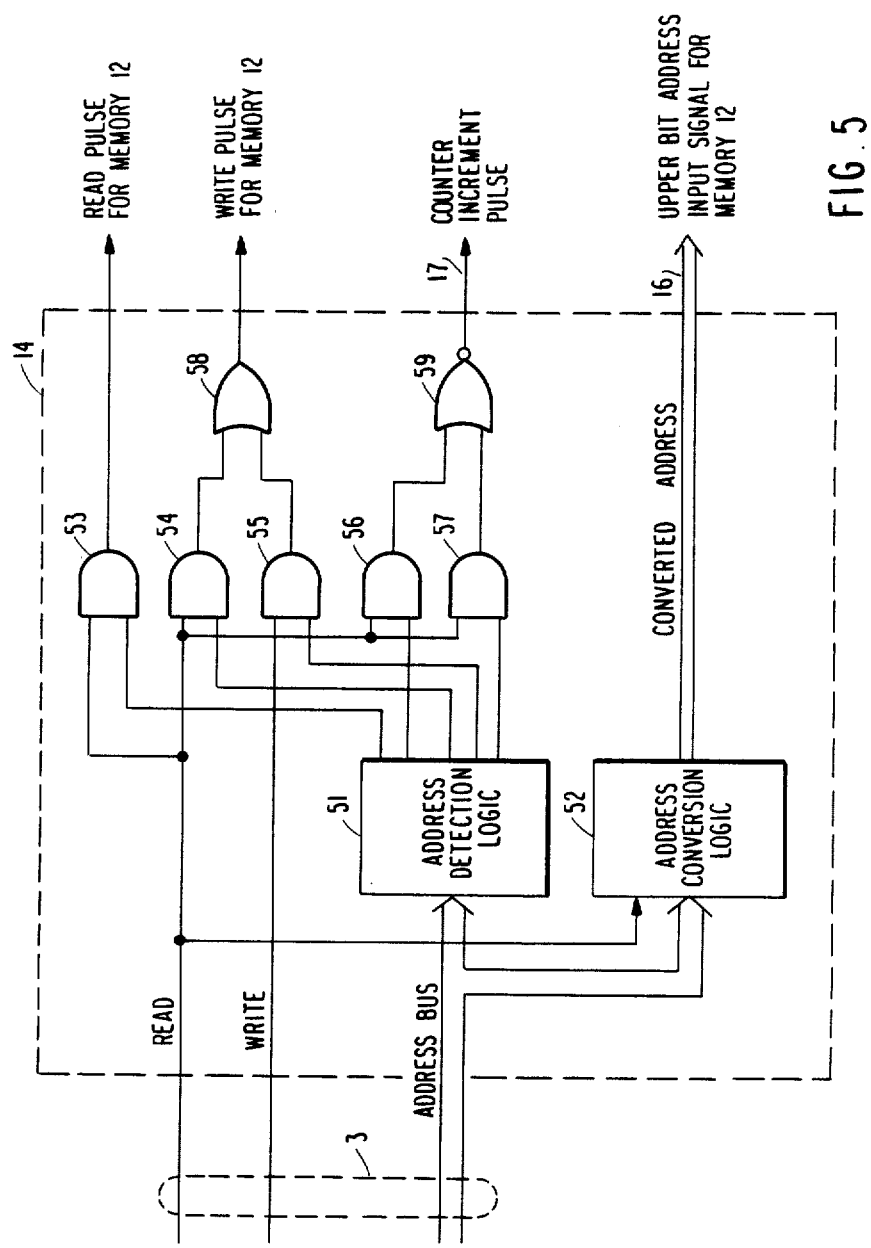
FIG. 5 is a detailed diagram of the address conversion circuit in FIG. 1.

An embodiment of the present invention will be described in the following. In the block diagrams for the present invention, like parts to those in FIG. 1 are shown by corresponding reference numerals. Referring to FIG. 2, 21 denotes a memory unit for tracing in accordance with the present invention, 24 denotes an address conversion circuit for generating a code or mark signal 26 together with a counter trigger pulse 27 and a write pulse 28 in response to selected signals f command bus 3, 23 denotes a binary counter responsive to the counter trigger pulse 27 for increasing its count to generate a binary address signal 25, and 22 denotes a tracing memory for recording data present on the data bus 2 together with the code or mark signal 26 at its address indicated by the binary output signal 25 from the binary counter in response to the write pulse 28.

Referring now to FIG. 2 and FIG. 4, the operation of the present invention will be described below.

As to the data to be traced, it is assumed that three kinds of data, A, B, and C, the same as above, are to be traced. When any of the data A, B, and C to be traced appears on the data bus 2 by input-output operation of the CPU 1, the address conversion circuit 24 in accordance with the information then present on the address and command bus 3 generates the code or mark signal 26 corresponding to the kind of the data, and immediately thereafter generates the write pulse 28. By this operation, the data on the data bus 2 and the above mentioned code are simultaneously written as one word in the memory at the address indicated by the binary output signal 25 from the counter. Thereafter the address conversion circuit 24 generates the counter trigger pulse 27, whereby the count of the binary counter 23 is increased by unity. The above operation is performed each time that any one of the addresses being monitored is detected by the address conversion circuit 24. The section (a) in FIG. 4 illustrates the contents of the tracing memory 22 in the case where the initial count of the counter was zero and the data to be written for the tracing was begun with the data A. In the illustration, the codes assigned to the data are (0, 0) for the data A, (0, 1) for the data B, and (1, 0) for the data C. Since, all the data are thus recorded in the order of appearance and, further, the kind of each data is in correspondence with the code, all the data can be readily discriminated from each other at the time of regeneration, or reading out, of the data to be traced. In this data tracing method, although the number of kinds of data are limited by the number of bits for the codes, they can be discriminated from each other by the code even if the periods of appearance of the data are different, and, further, the capacity of the memory can be utilized to the full and waste thereof avoided. And if respective data appear at the same periods, the data can be stored without using the codes but by assigning a mark only to a specific data as shown in the section (b) of FIG. 4. The section (b) in FIG. 4 shows the state of the data in the memory where a mark was assigned to the data A. By this arrangement, the period of the appearance of the same kind of data is indicated by the mark attached to the data A and all the kinds of the data appearing in one period are identified by the order counted from the reference data, i.e., the data A. In this case, there is no limit in the number of the kinds of the data to be stored in the memory and the memory is utilized to 100 percent.

FIG. 3 shows another embodiment of the present invention. Referring to the drawing, 31 denotes a memory unit for tracing which is a modification of the above described embodiment, 34 denotes an address conversion circuit for generating a code or mark signal 36 and a shift and write pulse 38 for a shift register or first-in first-out unit (FIFO, to be described below) 32 to use in writing the data and to be caused to write the data. The shift register or FIFO 32 shifts the data stored therein toward its output end at the same time as it receives a new input thereto and stores the data appearing on the data bus 2 and the code or make signal 36. The shift register 32 has a size sufficient to store several successive records of recent data and code signals produced when the selected address signals occur on bus 3 to enable fault determination upon a malfunction.

The shift register or FIFO 32 is provided with N pieces of registers, No. 1 to No. N, each in one word unit. The register No. N is connected at the input end, while the register No. 1 is connected at the output end. If a shift and write pulse 38 is applied, all the data in the internal registers are shifted to the next registers toward the smaller numbers. As a result, the register No. N will receive the data then present on the data bus 2 as a new data input thereto, the data on the register No. M ($1 < M \leq N$) will be shifted to the register No. (M - 1), and the data in the register No. 1 will disappear. Thus, the latest N sets of data are always stored in the FIFO. In this case, there is no need for the counter. By the way, 39 denotes a data bus for reading out the data to be traced.

Figure 6:
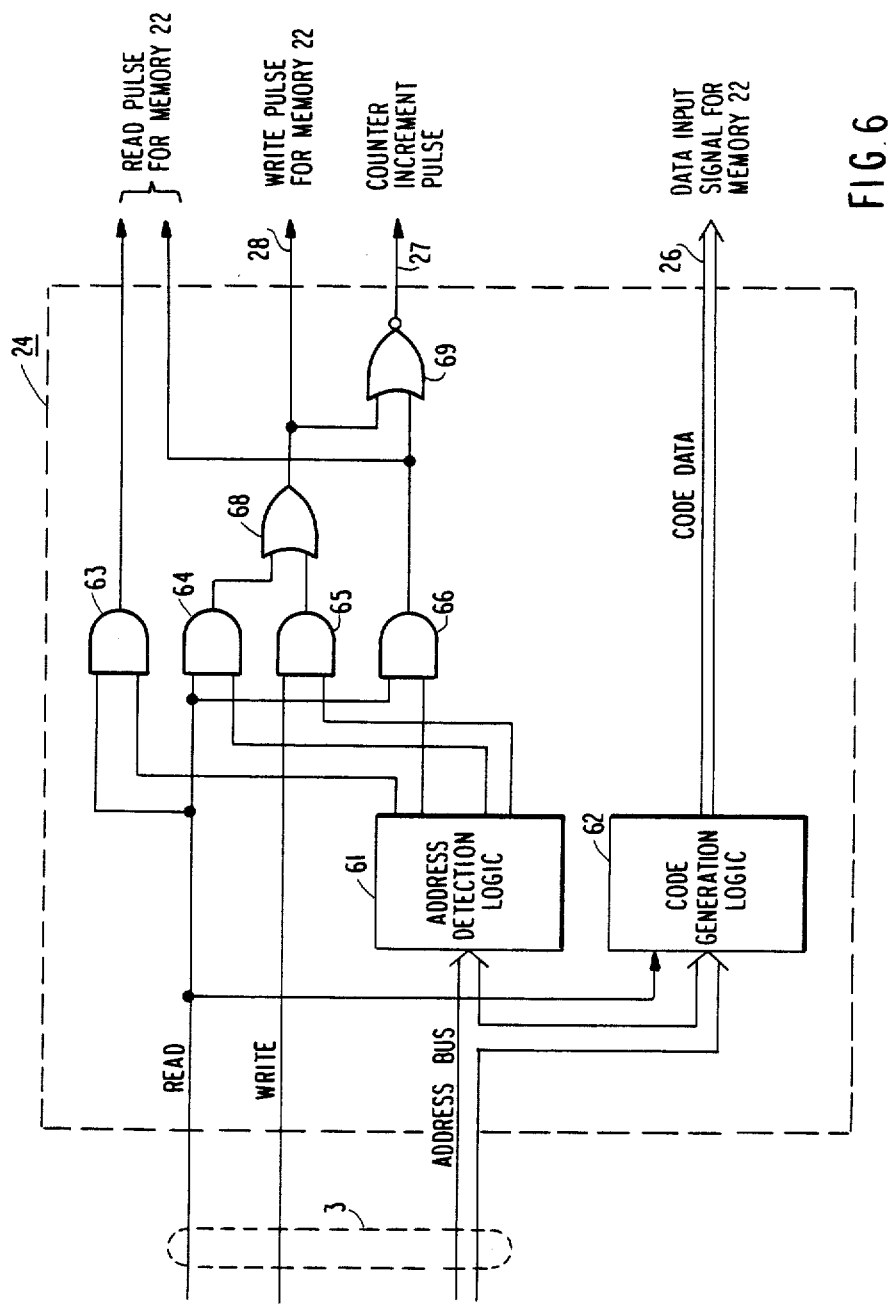
FIG. 6 is a detailed diagram of the address conversion circuit in FIG. 2.

FIG. 6 shows the detailed circuit diagram of an ADDRESS CONVERSION CIRCUIT (ACC) 24 displayed in FIG. 2. An ADDRESS DETECTION LOGIC (ADL) 61 and a CODE GENERATION LOGIC (CGL) 62 are composed of ROM, PAL or gate logic ICs and able to output logic signals corresponding to respective input signals.

The CGL 62 can convert any input address signal to a code corresponding to the kind of data, and output it to a portion of the data input of the tracing memory 22, provided that the input address signal corresponds to A, B or C. Data A, B or C will be given from a data bus 2 to the remaining data input of the memory 22.

If a part of the address signals from the bus 3 is different for each address, then this part of the addressing signals can be used as the CODE to be stored, and the CGL 62 can be eliminated.

ADL 61 transmits an active signal to AND gate 64 or 65 simultaneously with operation of said CGL 62 when the input address corresponds to A, B or C, to generate a write signal 28 to the tracing memory 22 during the read or write signal on bus 3.

The write signal 28 is outputted to the counter 23 through NOR gate 69, to increment the counter 23 at the end of each write signal.

AND gates 63 and 66 are used for reading out data stored in the tracing memory 22. Only two, read out addresses on bus 3 are enough for the present purpose, one being used for stored data and the other for stored code. When the read out address of data is inputted to ADL 61, it transmits an active signal to AND gate 63. Then, a read signal from a bus 3 is outputted from AND gate 63 as a read signal of the data memory section of the tracing memory 22. When an address for reading out a code is inputted to ADL 61 on bus 3, ADL 61 outputs an active signal to AND gate 66 so that the read signal from bus 3 is passed through AND gate 66 as a read signal for a code memory section of the memory 22, simultaneously with output of an increment signal for the counter 23 through NOR gate 69.

The output of CGL 62 is not used for addressing memory 22, and CGL does not need to include logic for detecting the read out addresses.

Since all of output can be determined for all of input in the case of ACC 24, the whole of ACC can be built up with ROM or PAL.

The ACC 34 shown in FIG. 3 is similar to ACC 24 except that some of the output signals are not required. Namely, write signal 28 may be deleted from the outputs of ACC 24, when a shift register is in use, and the increment signal 27 may be deleted from the outputs of ACC 24, when FIFO is in use.

As described so far, the circuit of the present invention is so constructed that the code or marking bits corresponding to the data to be traced may be instantaneously stored together with the data to be traced, and therefore it provides such an effect that one set, for example, of a memory unit for tracing can store the data of different appearing periods with 100 percent utility of its memory. And, the use of the shift register or FIFO provides the same effect as above without using a binary counter.

What is claimed is:

1. A memory unit for tracing comprising:
   a control unit having a central processing unit, a data bus, and an address and control bus wherein data signals are produced on the data bus simultaneous with various address signals on the address and control bus according to a program;
   pulse generating circuit means connected to the address and control bus for generating a code signal, a write pulse and a trigger signal in response to any one of a plurality of selected address signals and a control signal on the address and control bus;
   said code signal being produced on data outputs of the pulse generating circuit means having a predetermined value corresponding to the selected address signals;
   a tracing memory having data inputs connected to said data bus and to said data outputs of the pulse generating circuit means for simultaneously storing the data on said data bus and said code signal from said pulse generating circuit means in response to said write pulse; and
   a counter having count outputs connected to address inputs of said tracing memory and having an input receiving said trigger signal from said pulse generating circuit means for changing the count signal on the count output to successively address locations in the tracing memory in response to said trigger signal.

2. A memory unit for tracing comprising:
   a control unit having a central processing unit, a data bus, and an address and control bus wherein data signals are produced on the data bus simultaneous with various address signals on the address and control bus according to a program;
   pulse generating circuit means connected to the address and control bus for generating a code signal, and a write pulse in response to any one of a plurality of selected address signals and a control signal on the address and control bus;

said code signal being produced on data outputs of the pulse generating circuit means having a predetermined value corresponding to the selected address signals; and a shift register or FIFO having data inputs connected to said data bus and to said data outputs of the pulse generating circuit means for shifting word contents therein and for inputting and storing data on said data bus together with said code signal in response to said write pulse signal from said pulse generating circuit means.

* * * * *

UNITED STATES PATENT AND TRADEMARK OFFICE
CERTIFICATE OF CORRECTION

PATENT NO. : 4,835,675

DATED : May 30, 1989

INVENTOR(S) : Joji Kawai

It is certified that error appears in the above-identified patent and that said Letters Patent is hereby corrected as shown below:

Column 4, line 14, delete "f" and insert therefor -- from the address and --.

Column 5, line 15, "make" should be -- mark --.

Signed and Sealed this

Tenth Day of April, 1990

Attest:

HARRY F. MANBECK, JR.

*Attesting Officer*  *Commissioner of Patents and Trademarks*